(12) United States Patent
Bustamante et al.

(10) Patent No.: US 12,215,661 B2
(45) Date of Patent: Feb. 4, 2025

(54) PUMPED HYDRO ENERGY STORAGE SYSTEM AND METHOD, INCLUDING FIRE EXTINGUISHING FEATURES

(71) Applicant: Magellan & Barents, S.L., Oviedo (ES)

(72) Inventors: Ciriaco P Bustamante, Oviedo (ES); Pamela Díaz, Llodares (ES); Pedro Andrés Sáez, Bilbao (ES)

(73) Assignee: MAGELLAN & BARENTS, S.L., Oviedo (ES)

( * ) Notice: Subject to any disclaimer, the term of this patent is extended or adjusted under 35 U.S.C. 154(b) by 92 days.

(21) Appl. No.: 18/096,127

(22) Filed: Jan. 12, 2023

(65) Prior Publication Data

US 2023/0151788 A1 May 18, 2023

Related U.S. Application Data

(63) Continuation-in-part of application No. 17/068,801, filed on Oct. 12, 2020, now Pat. No. 11,365,713.

(60) Provisional application No. 63/298,971, filed on Jan. 12, 2022, provisional application No. 63/298,975, filed on Jan. 12, 2022.

(51) Int. Cl.
*F03B 13/06* (2006.01)
*F03B 17/00* (2006.01)

(52) U.S. Cl.
CPC ............ *F03B 13/06* (2013.01); *F03B 17/005* (2013.01); *F05B 2220/30* (2013.01); *F05B 2260/422* (2020.08)

(58) Field of Classification Search
CPC .. F03B 13/06; F03B 17/005; F05B 2260/422; F05B 2220/30
See application file for complete search history.

(56) References Cited

FOREIGN PATENT DOCUMENTS

WO   WO-2015118527 A1 * 8/2015 .............. F03B 13/06

* cited by examiner

*Primary Examiner* — Viet P Nguyen
(74) *Attorney, Agent, or Firm* — HORIZON IP PTE LTD.

(57) ABSTRACT

A pumped hydro energy storage system and method are disclosed. The system employs a high-density fluid, such as a slurry, to improve power output. In some cases, the fluid is a binary fluid system, with a high-density fluid and a lower-density fluid, such as water. The lower-density fluid flows through the turbine unit of the system, avoiding the need to modify the system to handle the high-density fluid, while achieving improved power output. The system can be configured with one atmospheric reservoir for a higher-density fluid and another one for a lighter-density fluid. Each of them is connected to a pressurized cavity which is filled with the higher-density or lighter-density fluid. The atmospheric tanks may be at the same elevation, or the tank with high density fluid might be higher for increased energy output. For example, the system may be placed on a topographical elevation. The system further includes a fire extinguishing sub-system to utilize the water or lower-density fluid to extinguish fires occurring in the proximity thereof.

19 Claims, 9 Drawing Sheets

400d

PUMPED HYDRO ENERGY STORAGE SYSTEM AND METHOD, INCLUDING FIRE EXTINGUISHING FEATURES

CROSS-REFERENCE TO RELATED APPLICATIONS

This application is a continuation-in-part of the U.S. patent application filed on Oct. 12, 2020, with application Ser. No. 17/068,801, titled "Pumped Hydro Energy Storage System and Method". This application also claims the benefit of U.S. Provisional Application No. 62/657,941, filed on Apr. 16, 2018; U.S. Provisional Application No. 62/672,566, filed on May 16, 2018; U.S. Provisional Application No. 62/680,597, filed on Jun. 5, 2018; U.S. Provisional Application No. 62/747,678, filed on Oct. 19, 2018; U.S. Provisional Application No. 63/298,971, filed on Jan. 12, 2022; and U.S. Provisional Application No. 63/298,975, filed on Jan. 12, 2022. The disclosures of above said references are incorporated herein by reference in their entireties for all purposes.

FIELD OF THE INVENTION

The present disclosure relates to pumped hydro energy storage system and method. In particular, the present disclosure relates to pumped hydro energy storage system and method using a high-density fluid or a combination of a high-density fluid and a lower-density fluid, such as water, to increase power output. The hydro energy storage system further includes fire extinguishing functions for putting out proximately located fires.

BACKGROUND

Renewable energies, such as those harnessed from the sun, wind and water, are popular forms of energy to generate electricity, since they have minimal impact on our environment. For example, renewable energy does not pollute the environment, such as $CO_2$ emissions. Although renewable energy has advantages, there are also disadvantages. For example, renewable energy is highly dependent on nature, which is undependable or unreliable at best. Solar power requires sunlight, which can be affected by clouds; wind power relies on the wind, which can come and go; water power relies on water, which relies on limited number of water ways and has numerous challenges. These unreliability or inconsistencies of renewable energy contribute to imbalances in supply and demand. Such imbalances cause huge swings in energy pricing.

Conventional pumped hydro energy relies on water flowing down from an upper reservoir to a lower reservoir through a penstock. The water then turns a turbine to generate electricity which is sent to the grid. To recharge the upper reservoir, water is pumped up the penstock. Pumped hydro energy storage, since it has, besides a turbine, a pump to recharge the system, provides controllability and reliability. This stabilizes the imbalances of supply and demand which are inherent in traditional renewable energy sources. Furthermore, an important consideration for conventional hydro power energy systems and pumped hydro storage is the footprint required by the reservoirs.

The present disclosure is directed to a small footprint pumped hydro energy storage system and method with high power output.

SUMMARY

Embodiments generally relate to an unconventional pumped hydro storage system and application of the pumped hydro storage system. The system has a smaller footprint and higher energy density than conventional pumped hydro power energy systems. The system uses a high-density fluid, and allows for different configurations where upper and lower reservoirs may be at the same elevation. Hydraulic pumps and turbines may be placed higher than the lower reservoir, for example, on the surface above an underground mine.

In particular, an embodiment relates to a pumped hydro storage system which includes a first reservoir and a second reservoir which is disposed below the first reservoir. The system also includes a turbine unit. The turbine unit includes a first turbine unit flow port and a second turbine unit flow port. A penstock is provided which is in fluid communication with the first and the second reservoirs. The penstock includes a first portion which is coupled to the first reservoir and the first turbine unit flow port and a second portion which is coupled to the second reservoir and the second turbine unit flow port. The turbine unit is disposed proximate to the second reservoir. A slurry circulates through the system. The slurry is a high-density fluid which has a density greater than water. The slurry flows through the turbine in a first or forward direction from the first reservoir to the second reservoir to cause the turbine unit to generate energy. In the recharge mode, the slurry flows through the turbine unit in the second or reverse direction from the second reservoir to the first reservoir to recharge the system. The high-density slurry increases power output of the system as compared to systems using water.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of various embodiments. In the following description, various embodiments of the present disclosure are described with reference to the following, in which.

DETAILED DESCRIPTION

Embodiments described herein generally relate to a pumped hydro energy storage system. The present pumped hydro energy storage system produces higher energy output per volume than conventional pumped hydro energy storage systems. In some embodiments, the pumped hydro energy system, unlike conventional pumped hydro energy storage systems, can be implemented on flat land or even topography.

Figure 1:
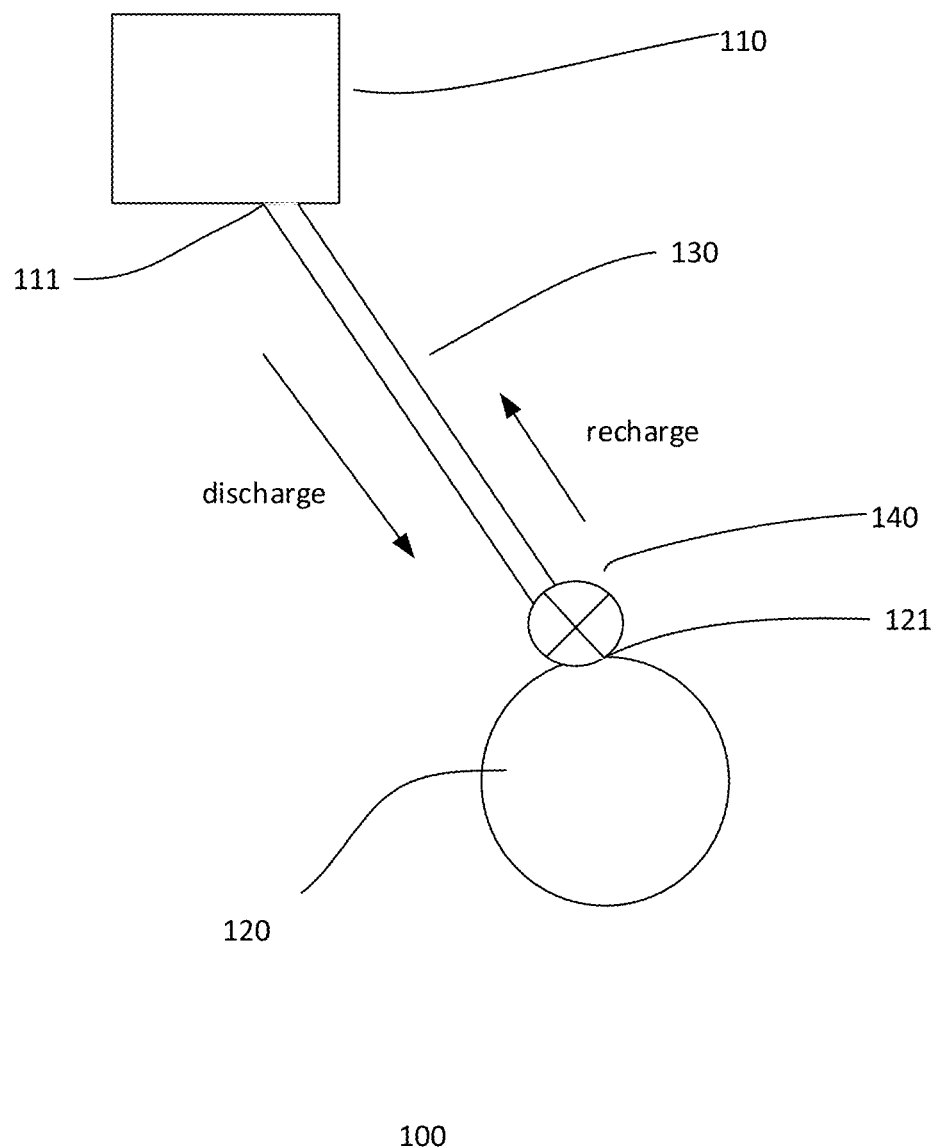
FIG. 1 shows a simplified diagram of an exemplary embodiment of a pumped hydro storage system.

FIG. 1 shows a simplified diagram of an embodiment of a pumped hydro energy storage system 100. As shown, the pumped hydro energy system includes an upper reservoir 110 and a lower reservoir 120 connected by a penstock 130. In one embodiment, the upper reservoir is disposed above the lower reservoir. The difference in elevation or height of the two reservoirs may be referred to as the head. The penstock is coupled to an upper reservoir port 111 and a lower reservoir port 121. The penstock may be a pipe, channel or other types of conduits, which provides fluid communication between the upper and lower reservoir via the upper and lower reservoir ports. In one embodiment, a turbine unit 140 is disposed proximate to the lower reservoir port. The turbine unit is a reversible turbine. For example, the turbine is a Francis turbine which serves as a power generator when rotated in a first direction and a pump when rotated in a second direction. Other types of turbines or turbine unit configurations may also be useful. For example, the turbine unit may include a separate turbine for generating power and a pump for recharging the system. Providing a separate turbine and pump may be particularly useful for high pressure applications. For example, a Francis turbine can only operate at 70 BAR. The use of separate turbine and pump configuration can operate beyond 70 BAR.

In operation, fluid contained in the upper reservoir flows through the penstock to the lower reservoir by gravity. This can be referred to as the discharging state of the system. As fluid flows through the penstock into the lower reservoir, it turns the Francis turbine in a first direction to generate electricity. The electricity can be transmitted by transmission lines. For example, in times of energy demand, fluid is flowed from the upper reservoir to the lower reservoir to generate electricity. The turbine can be rotated in the second direction, pumping fluid in the lower reservoir up towards the upper reservoir. Alternatively, a pump is used to pump fluid up towards the upper reservoir. This can be referred to as the charging or recharging state of the system. The system may be recharged in times of low energy demand or when the upper reservoir is empty or near empty.

In one embodiment, the system is a closed system. In a closed system, the reservoirs are enclosed. For example, the reservoirs are fluid tanks which form a closed loop. The lower reservoir may be referred to as a high-pressure reservoir while the upper reservoir may be referred to as a lower pressure reservoir relative to the lower reservoir. In one embodiment, the upper reservoir may be a cylindrical atmospheric tank while the lower reservoir is a high-pressure spherical tank. Other configurations of tanks may also be useful. The reservoirs may include fill ports for filling them with fluids. The tanks may be configured to have about the same capacity.

The system may be designed with the desired parameters to generate the desired amount of electricity and when the system needs to be recharged. For example, the flow rate of the fluid which is determined by the size of the penstock, the head which is determined by the height between the upper and lower reservoirs, and volume of the reservoirs can be configured to determine the power output and recharge time of the system. The flow rate and head determine the power output and the volume of the reservoirs determines the time between recharging.

In one embodiment, the fluid of the pumped hydro storage system is a high-density fluid. The high-density fluid has a density of greater than water. For example, the high-density fluid may have a density which is ≥3x, where x is the density of water. In one embodiment, the high-density fluid is a slurry mixture. Various types of slurry mixtures may be employed. The slurry mixture may include, for example, metal oxide particles mixed with a lower-density fluid, such as water. Other types of particles and lower-density fluids may also be useful. The volume of particles in the slurry may be equal to or greater than about 50%. For example, the percentage of particles may be about 50-85%. In other embodiment, the percentage of particles may be 50-75%. The higher the volume of particles, the higher the density of the slurry. All percentages are volume percentages. Other percentages may also be useful.

In one embodiment, the dense fluid is prepared by blending dunite with mud. For example, the dunite and mud are obtained from mine run off which includes water and fine particles of dunite. The particle size of the dunite may be about 40-60 um. This mud, in one embodiment, has a density of approximately 1.2. The mud is blended with ultrafine material from a wet line limestone processing plant, which includes solid particles of $CaCO_3$ with particle density which is about greater than 2.7 and a particle size d80<20 μm to d70<10 μm. The $CaCO_3$ particles coalesce with water into a mud with a density of about 1.7, which is blended with the dunite mud to obtain a base fluid with 50%-55% $CaCO_3$ by weight, 7%-9% dunite by weight, and 36%-43% water. This base fluid is then a Bingham plastic and can hold small particles of dense minerals, such as magnetite, barite, metal pellets, etc. This is advantageous as it makes it possible to formulate a broad range of densities while maintaining stability and fluidity.

In one embodiment, the particles of the slurry are submicron in size to avoid damaging the turbine. As for the remaining composition, it includes a lower-density fluid, such as water. In one embodiment, to prevent the slurry from coalescing and to improve flow, a small amount of surfactant may be added. For example, about less than 1% of surfactant can be added. In some cases, antifreeze may be added to prevent the freezing of the slurry. The concentration of antifreeze should be sufficient to prevent the slurry from freezing.

In one embodiment, the high-density fluid is a magnetite slurry mixture. The magnetite slurry mixture may achieve a density of 3 to 4 tons/m$^3$, which is more than 3 times of the density of water. Other types of slurry mixtures, as discussed, can also be employed as the high-density fluid. The density may depend on the mineral content and composition.

By employing high-density fluid, a more compact pumped hydro energy storage system can be achieved. For a given reservoir or tank volume, the energy storage capacity is proportional to the density of the fluid. For example, in the case where the high-density fluid has a density of 3x, the energy storage capacity of the system is 3 times of that when water is used. This is due to the mass flow rate being about 3 times more than that of water. Alternatively, the system can produce the same amount of energy output using less volume of fluid and/or less height differential between the upper and lower reservoirs. This results in lower costs as well as more flexibility in designing a system to satisfy output requirements.

An advantage, as discussed with using a high-density fluid, is higher power output. The use of a high-density fluid can be easily retrofitted into existing pumped hydro storage systems by modifying the penstock and pump to handle the high-density fluid, thereby increasing the power output. Furthermore, existing designs of hydro storage systems can be modified to serve as models for highly efficient hydro storage systems which handle a high-density fluid. The cost to build, for a given power output requirement, would be reduced due to less volume needed, smaller penstocks and/or reduced elevation or height between the reservoirs.

Figure 2:
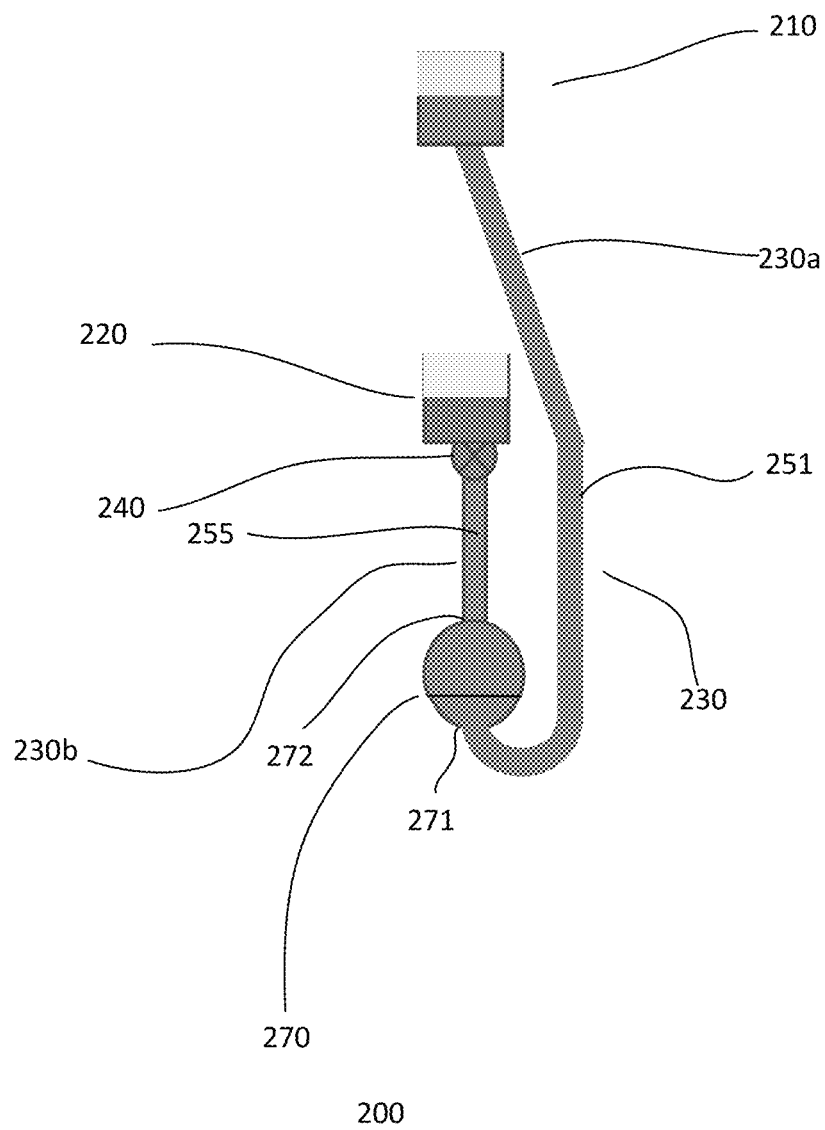
FIG. 2 shows a simplified diagram of an alternative exemplary embodiment of the pumped hydro storage system.

FIG. 2 shows a simplified diagram of another embodiment of a pumped hydro energy storage system 200. The system may include similar components as that described in FIG. 1. Such components may not be described or described in detail.

In one embodiment, the system is a closed system with upper and lower reservoirs 210 and 220. The reservoirs are fluid communicatively coupled by a penstock 230. As shown, the system is configured as a binary fluid system which utilizes first and second fluids 251 and 255. In one embodiment, the first fluid is a high-density fluid and the second fluid is a lower-density fluid compared to the first fluid. The high-density fluid, for example, has a density of greater than water. The high-density fluid will have a density which is ≥3.0×, where x is the density of water. Other densities for the high-density fluid may also be useful. The high-density fluid may be a slurry mixture, such as a magnetite slurry mixture. Other types of slurry mixtures or high-density fluids may also be useful. As for the second fluid, in one embodiment, it is water. For example, the high-density fluid is 3 times denser than the lower-density fluid. Providing different density differentials between the fluids may also be useful. The larger the difference, the more efficient the system. Other types of lower-density fluids may also be useful.

The penstock 230 includes first and second portions 230*a* and 230*b* which are communicatively coupled to the first and second reservoirs at both ends and a cavity reservoir 270 coupled to second ends of the first and second portions of the penstock. In one embodiment, the cavity reservoir is a high-pressure cavity tank. The high-pressure cavity tank should sustain the overburden pressure of the system. In one embodiment, the high-pressure cavity tank sustains roughly the same pressure as the overburden pressure of the system. The cavity tank may be a spherical high-pressure cavity tank. Other types of high-pressure cavity tanks may also be useful.

In one embodiment, the cavity tank is disposed close to the second or lower reservoir, but at some horizontal distance to ensure overburden pressure is close to that exerted by the slurry column. A first cavity tank port 271 of the cavity tank coupled to the first portion of the penstock is disposed at a bottom of the cavity tank while a second cavity tank port 272 of the cavity tank coupled to the second portion of the penstock is disposed at a top of the cavity tank. A turbine unit 240 is disposed proximate to a lower reservoir port. The turbine may be a Francis turbine. Alternatively, the turbine unit may include a separate turbine, such as a Pelton turbine and a pump. Other types of turbines or configurations of turbine units may also be useful.

In one embodiment, the pressure in the cavity tank is generated by the column of high-density fluid. The lower reservoir can be an atmospheric tank. For example, the lower reservoir may be a cylindrical atmospheric tank. As for the upper reservoir, it may also be an atmospheric tank.

In operation, the high-density fluid contained in the upper reservoir flows through the penstock to the cavity tank by gravity. The pressure in the cavity tank due to the column of slurry is much higher than that of the column of the lower-density fluid contained in the lower reservoir, so it will flow upwards, and then through the injector of the turbine above. The injector port, for example, is the inlet which water is fed into the turbine. Due to the stark difference in density, the high-density fluid remains in the bottom of the cavity tank while the lower-density fluid is disposed above the high-density fluid in the cavity tank. Furthermore, the configurations of the first and second cavity tank ports are configured to prevent the mixing of the first and second fluids. As the high-density fluid continues to flow out of the first or higher reservoir by gravity, it forces the lower-density fluid upwards back into the second or lower reservoir, causing the turbine to rotate to generate electricity. This can be referred to as the discharging or power generation state of the system. In contrast, in the recharging state, the lower-density fluid (e.g., water) is pumped down into the cavity reservoir, forcing the high-density fluid back into the upper reservoir. The cavity tank should be configured to accommodate the pressure created by the high-density fluid forcing the lower-density fluid back into the lower reservoir.

In one embodiment, the system is configured so that the high-density fluid does not come in contact with the turbine unit. This advantageously avoids configuring the system to handle the high-density fluids. For example, the particle size of the high-density fluid need not be in the sub-micron regime to avoid damaging the turbine. The particle size of the slurry may be about several microns to several hundred microns. The particle size of the slurry should have a non-uniform distribution to facilitate higher volume percentage of particles in the slurry and flow within the penstock.

Figure 3:
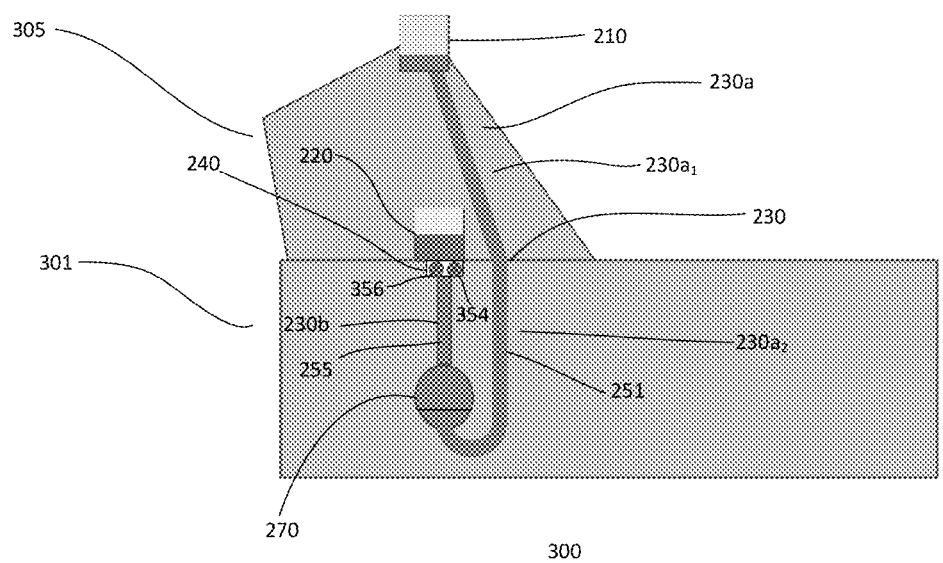
FIG. 3 shows a simplified diagram of another alternative exemplary embodiment of the pumped hydro storage system.

FIG. 3 shows an application of the pumped hydro energy storage system of FIG. 2. The system of FIG. 3 includes common elements as the system of FIG. 2. Common elements may not be described or described in detail. Illustratively, the system is implemented in a mine located in, for example, a mountain 305. The mine may be a coal mine. Other types of mines may also be useful. Implementing the system in a mine has advantages as mine shafts deep into the ground 301 exists, thereby reducing construction cost.

The system includes an upper reservoir 210 located close to the top of a mountain, creating an elevation difference between a lower reservoir 220 located at the base of the mountain, for example, within the mine. Other locations of the reservoirs may also be useful. The location may take advantage of the terrain and/or existing structures, such as tunnels and shafts. Although the system is implanted in an existing mine, implementing the system in other locations which take advantage of the natural terrain, such as salt domes or strata, may also be useful.

The upper reservoir is configured to be in fluid communication with the lower reservoir via a penstock 230. A cavity tank 270 is disposed within the penstock below the lower reservoir. The penstock includes first and second penstock portions 230*a* and 230*b*. The first penstock portion is coupled to the upper reservoir port and a first cavity tank port located at a bottom of the cavity tank; the second penstock portion is coupled to the lower reservoir port and a second cavity tank port located at a top of the cavity tank. As shown, the first penstock includes first and second first penstock subsections $230a_1$ and $230a_2$. The first penstock subsection is disposed above ground and coupled to the upper reservoir and the second penstock subsection is disposed below ground and coupled to the cavity tank.

In other words, the cavity tank is located below ground. In one embodiment, a turbine unit 240 is disposed proximate to the lower reservoir. For example, it is disposed between the penstock and the lower reservoir port. In one embodiment, the turbine unit includes a turbine 354 and a pump 356. The turbine, for example, is a Pelton turbine. Other types of turbines may also be useful. The turbine, for example, can sustain high pressures of the system.

A high-density fluid 251 is contained in the upper reservoir. A lower-density fluid 255 is disposed in the lower reservoir. The operation of the system 300 is similar to that of system 200 of FIG. 2. For example, lower-density fluid flowing into the lower reservoir causes the turbine to turn in the first direction, generating power. To recharge the system, the pump pumps the lower-density fluid down to the cavity tank in the second direction, causing the high-density fluid to flow back into the upper reservoir.

Providing the high-pressure cavity tank below ground is advantageous as it can utilize the lithostatic pressure, thereby countering the pressure caused by the fluid. This reduces the construction costs of the lower reservoir. In addition, the mountain terrain provides a natural elevation for the upper reservoir. The height at which the upper reservoir is elevated can be configured based on output requirements. For example, lower elevations may be useful to reduce costs associated with building the upper reservoir and penstock if output requirements are met.

FIGS. 4a-4d show various alternative embodiments of pumped hydro storage systems. The systems include similar components as the systems of FIGS. 1-3. Common elements may not be described or described in detail. The systems can be advantageously implemented on flat terrain. For example, the first and second reservoirs 410 and 420 can be disposed at about the same altitude. These embodiments may be particularly advantageous for implementation on flat land or floating on deep water. This is contrary to conventional pumped hydro storage systems which require different heights or altitudes between the upper and lower reservoirs.

Figure 4A:
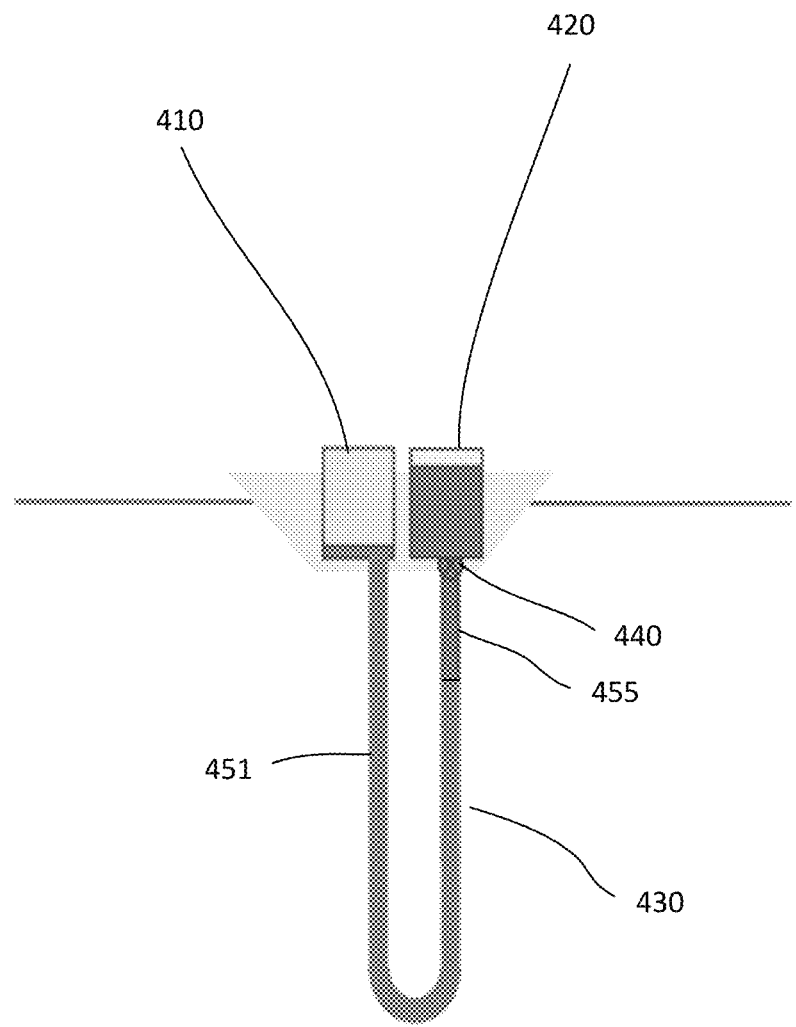
FIGS. 4a-d show simplified diagrams of alternative exemplary embodiments of pumped hydro storage systems.

Referring to FIG. 4a, an embodiment of a pumped hydro storage system 400a is shown. The system includes first and second reservoirs 410 and 420. In one embodiment, the reservoirs are disposed at about the same altitude or height. For example, the reservoirs are located on a level ground or, in the case of a water application, on a ship or an off-shore rig. Providing the reservoirs at different heights may also be useful. Preferably, the high-density reservoir is located above the lower-density reservoir. The reservoirs are in fluid communication by a penstock 430. As shown, the penstock is a U-shaped penstock. Other shaped penstocks may also be useful. The length of the penstock may be from hundreds of meters to kilometers long.

The first reservoir serves as a container for the high-density fluid 451 and the second reservoir serves to contain the lower-density fluid 455. Due to the higher density of the high-density fluid relative to the lower-density fluid, gravity causes the high-density fluid to flow downwards, forcing the lower-density fluid up into the second reservoir. This turns a turbine unit 440 disposed proximate to the second reservoir port to generate power. For example, the turbine unit includes a combined turbine-pump, such as a Francis turbine-pump. The system recharges by causing the turbine unit to reverse its rotation to the second direction. Reversing the direction of the turbine pumps water downward, towards the first reservoir. This forces the high-density fluid back into the first reservoir, recharging the system. In other embodiments, the turbine unit may include a separate turbine, such as a Pelton turbine, and a pump. Other types of turbine or configurations of turbine units may also be useful.

In one embodiment, the volume of the first or high-density and second or lower-density fluids are configured so that in discharging or charging state, the high-density fluid does not contact the turbine. Such a configuration advantageously avoids the need to configure the pump to handle the high-density fluid. This also enables for use of larger particulates in the slurry, advantageously reducing costs.

Figure 4B:
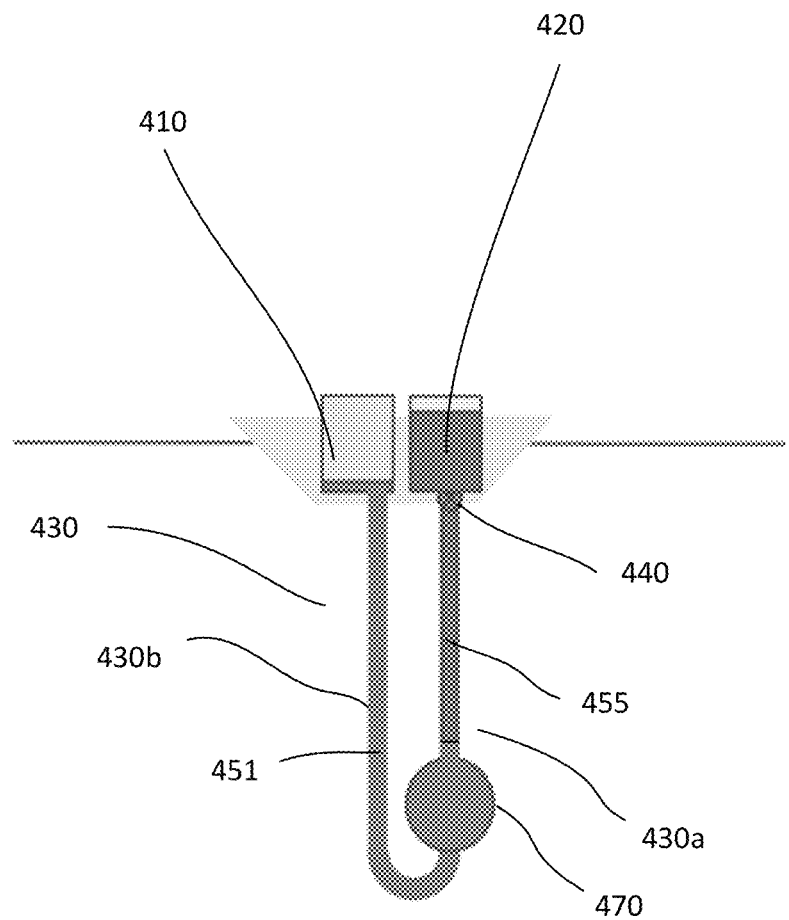

FIG. 4b shows another embodiment of a pumped hydro storage system 400b. The system of FIG. 4b is similar to that described in FIG. 4a. Common elements may not be described or described in detail.

The system includes first and second reservoirs 410 and 420 which are located at about the same altitude or height. Providing the reservoirs at different heights may also be useful. The reservoirs are in fluid communication by a penstock 430. As shown, the penstock is a U-shaped penstock. Other shaped penstocks may also be useful. In one embodiment, the penstock is divided into first and second portions 430a and 430b, separated by a cavity reservoir or tank 470, such as that described in FIGS. 2-3. The cavity reservoir, for example, is a spherical high-pressure cavity reservoir. The upper and lower reservoirs may be cylindrical-shaped atmospheric reservoirs. Other configurations of reservoirs may also be useful.

Providing a cavity reservoir advantageously increases the fluid capacity of the system. As shown, the cavity tank is disposed below the second reservoir between the first and second penstock portions. For example, the first penstock portion coupled to the first reservoir is coupled to a first cavity tank port located at a bottom of the cavity tank and the second penstock portion is coupled to the second reservoir and a second cavity tank port located at a top of the cavity tank. This configuration also reduces the risk of mixing between the high-density and lower-density fluids. The operation of the system is similar to that described in FIG. 4a, except with an increased capacity due to the cavity tank.

Figure 4C:
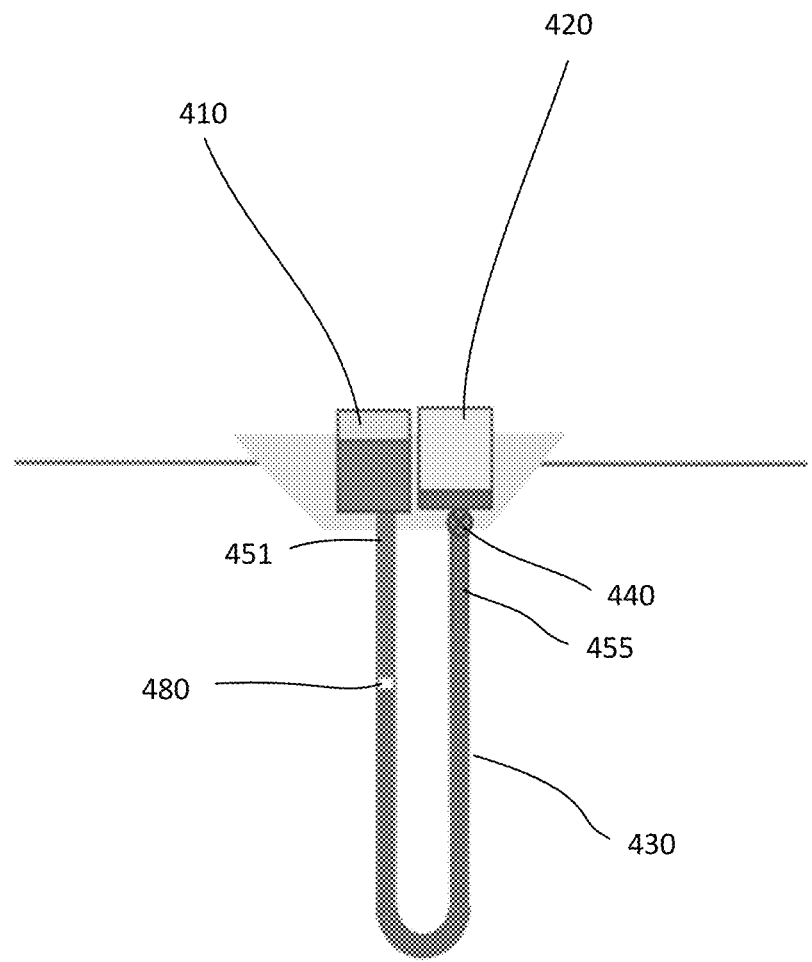

FIG. 4c shows another embodiment of a pumped hydro storage system 400c. The system of FIG. 4c is similar to that described in FIGS. 4a-4b. Common elements may not be described or described in detail.

The system includes first and second reservoirs 410 and 420 which are located at about the same altitude or height. Providing the reservoirs at different heights may also be useful. The reservoirs are in fluid communication by a penstock 430. As shown, the penstock is a U-shaped penstock. Other shaped penstocks may also be useful. In one embodiment, a fluid separator 480 is disposed in the penstock between the first and second fluids 451 and 455. The fluid separator, for example, may be formed of a highly abrasion resistant plastic with a density between that of both fluids. For example, the separator floats on the high-density fluid while it sinks in the lower-density fluid. The fluid separator is configured to be slidable within the penstock and maintains the separation of the high-density and lower-density fluids. Providing a separator ensures that small particles in the high-density fluid will not inadvertently be carried up through to the turbine unit. The use of the fluid separator may also be applied to embodiments described in FIGS. 2-3. The system is configured so that the fluid separator does not reach the turbine 440. The operation of the system is similar to that described in FIGS. 4a-b.

Figure 4D:
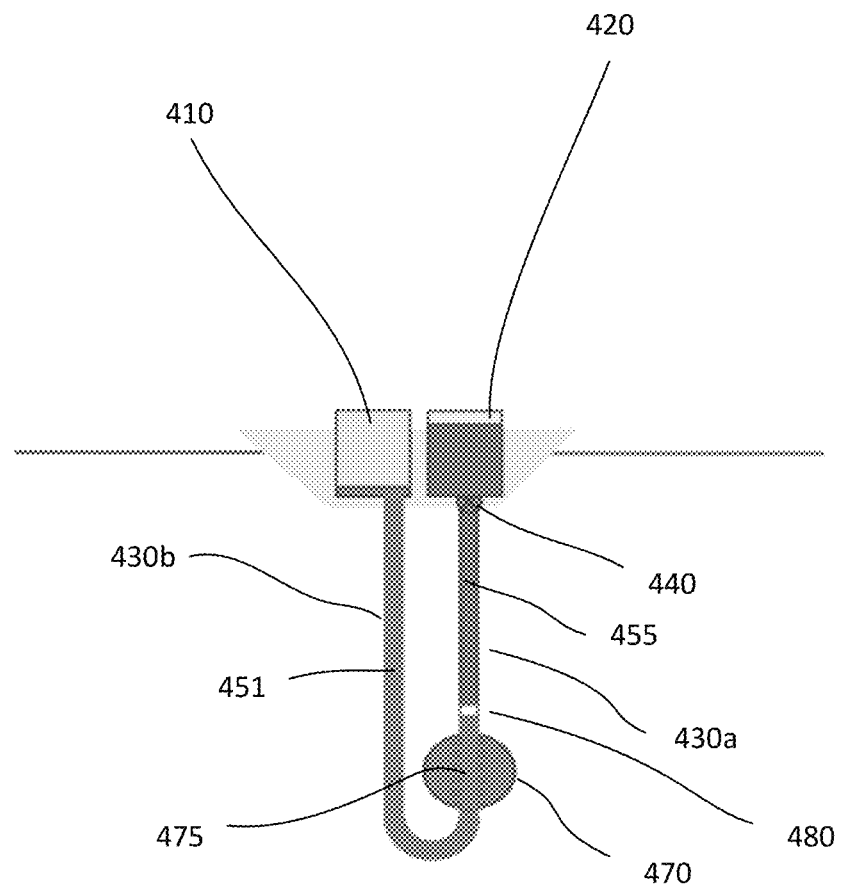

FIG. 4d shows another embodiment of a pumped hydro storage system 400d. The system of FIG. 4d is similar to that described in FIGS. 4a-4c. Common elements may not be described or described in detail.

The system includes first and second reservoirs 410 and 420 which are located at about the same altitude or height. Providing the reservoirs at different heights may also be useful. The reservoirs are in fluid communication by a penstock 430. As shown, the penstock is a U-shaped penstock. Similar to FIG. 4b, the penstock is divided into first and second portions 430a and 430b, separated by a cavity reservoir 470, such as that described in FIGS. 2-3. Also, similar to FIG. 4c, a fluid separator 480 is provided in the penstock to ensure the separation of the high-density and lower-density fluids. In one embodiment, the cavity tank is configured with a fluid separator cage 475 which ensures that the fluid separator can pass through the cavity tank to the first or second portion of the penstock. For example, the cage serves as a guide for the fluid separator while allowing the flow of fluids outside the cage and to maintain separation. The cage may be a set of vertical bars or a perforated pipe with lateral orifices. The cage is configured to enable the fluid separator to flow above and below the cavity reservoir. The operation of the system is similar to that described in FIGS. 4a-c. Furthermore, it is understood that the fluid separator may also be configured into the system described in FIGS. 2-3.

Figure 5:
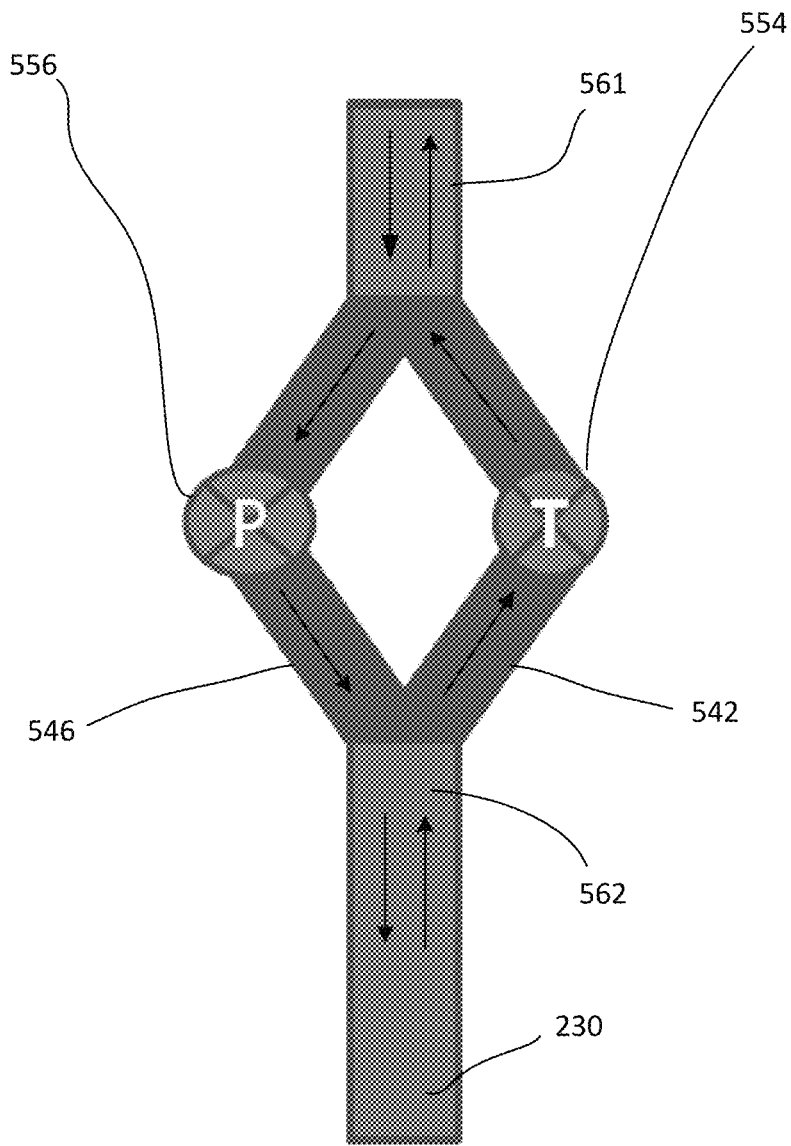
FIG. 5 shows an exemplary embodiment of a turbine and pump configuration.

FIG. 5 shows an embodiment of a turbine unit 240. As shown, the turbine unit includes a separate turbine 554 and a pump 556. For example, the turbine unit includes separate flow paths or pipes which coupled to the penstock 230. As shown, the turbine unit includes a pump path 546 and a turbine path 542. For example, in the applications as described in FIGS. 2-3 and FIGS. 4a-d, the upper end of the penstock is coupled to the second or lower reservoir containing the lower-density fluid while the lower end of the penstock is coupled to the first or upper reservoir containing the high-density fluid, either directly or indirectly via a cavity tank. For example, the upper end of the penstock is the turbine outlet 561 while the lower end of the penstock is the turbine inlet 562. As discussed, the system is configured so that the high-density fluid does not come into contact with the turbine unit. For example, only the lower-density fluid flows through the turbine unit.

In power generation mode, the lower-density fluid, such as water, is pushed through the turbine path upwards toward the lower reservoir, as indicated by the upward arrows. This causes the turbine to turn in the first direction, generating power. In recharge mode, the lower-density fluid is pumped downwards back towards the upper reservoir through the pump path by the pump, as indicated by the downward arrows. This causes the high-density fluid to be pushed back into the upper reservoir, recharging the system.

As described, the use of a high-density fluid in the system improves the power output. For example, in the case of a system which employs a binary fluid system with a high-density fluid and a lower-density fluid, such as water, in a flat terrain which involves first and second atmospheric tanks at the same elevation and a high-pressure cavity tank below, such as the systems described in FIGS. 4b and 4d, the pressure at the bottom cavity tank is that exerted by the column of high-density fluid=$c*H*d1$ and the pressure at the turbine inlet is $cHd1-cHd2=cH(d1-d2)$, where H is the difference in elevation between the first (high-density fluid) reservoir and the pressurized cavity tank,
d1 is the density of the high-density fluid, d2 is the density of the lower-density fluid, and
c is a constant.

The power P generated by the system is proportional to the flow rate Q and to the pressure at the turbine inlet and can be defined as $P=k*Q*cH(d1-d2)$, where k is a constant. In the case where the density of the high-density fluid is 3 times of the lower-density fluid, the use of a binary fluid system increases power output by about a factor of 2. As described, the use of a high-density fluid in the system improves power output.

In the case which employs a high-density fluid and a lower-density fluid, such as water, which includes first and second atmospheric tanks at different elevations and a high-pressure cavity tank below, such as the systems described in FIGS. 2 and 3, the pressure at the bottom pressurized cavity tank is $cHd1$ while the pressure at the turbine inlet is $cHd1-chd2$, where h is the difference in elevation between the cavity tank and the second (lower-density fluid) reservoir. The power generated by the system can be defined as $P=k*Q*(cHd1-chd2)$. If H is much greater than h, then we get almost as much power if we used high-density fluid alone, but only passing water through the turbine.

Figure 6:
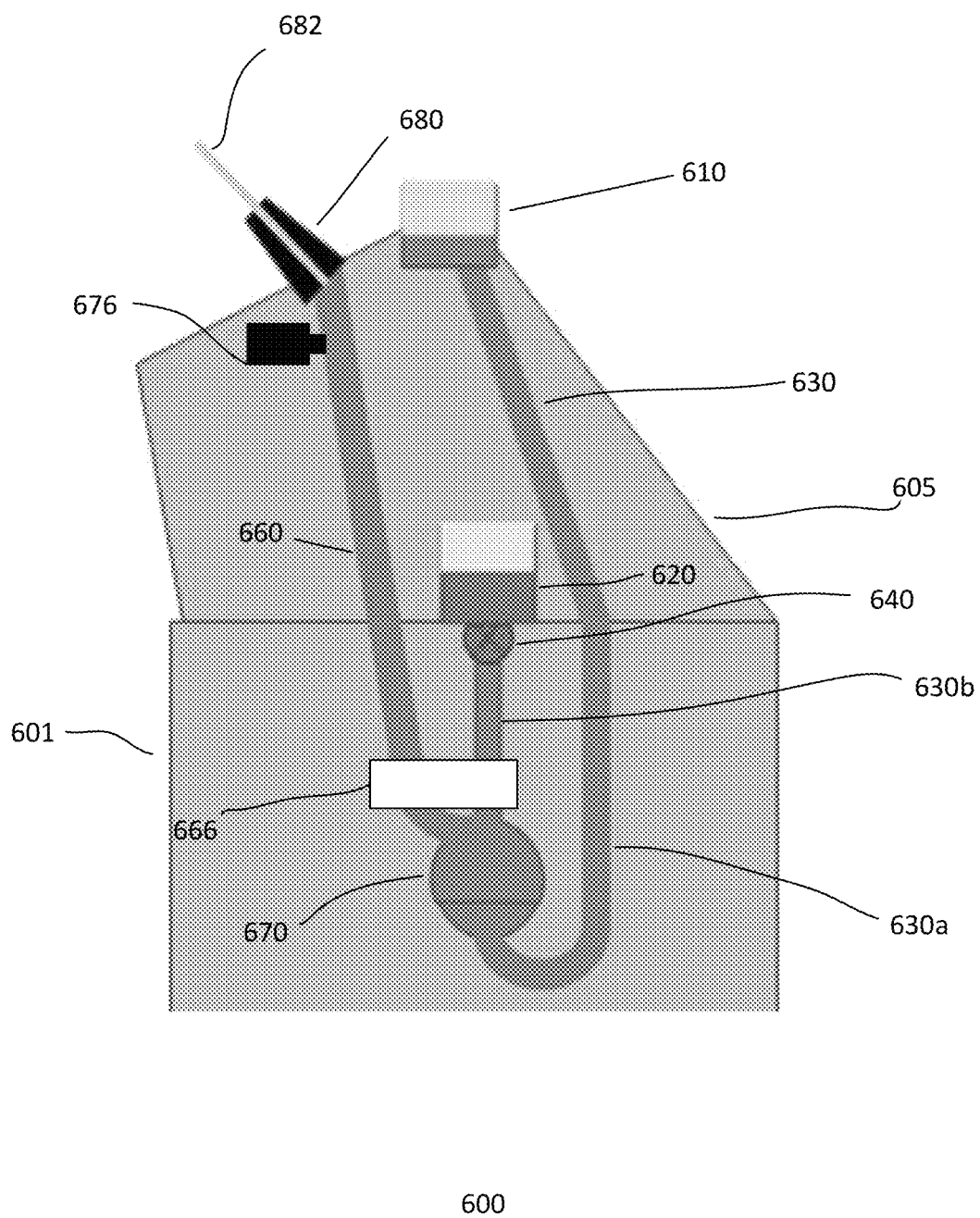
FIG. 6 shows an exemplary embodiment of a pumped hydro storage system with fire extinguishing functions.

FIG. 6 shows another embodiment of a pumped hydro energy storage system 600. The system is similar to that described in FIG. 3. Common elements may not be described or described in detail. The system is implemented in a mine located in, for example, a mountain or escarpment 605. The mine may be a coal mine. Other types of mines may also be useful. Implementing the system in a mine has advantages as mine shafts deep into the ground 601 exists, thereby reducing construction cost. Other implementations of the system may also be useful.

The system includes an upper reservoir 610 located at or close to the top of the escarpment, creating an elevation difference between a lower reservoir 620. For example, the lower reservoir may be located at the base of the escarpment with the mine. Other locations of the reservoirs may also be useful. For example, the lower reservoir may be above or below the base of the escarpment. The location may take advantage of the terrain and/or existing structures, such as tunnels and shafts. Although the system is implanted in an existing mine, implementing the system in other locations which take advantage of the natural terrain, such as salt domes or strata, may also be useful.

The upper reservoir is configured to be in fluid communication with the lower reservoir via a penstock 630. A cavity tank 670 is disposed within the penstock below the lower reservoir. The penstock includes first and second penstock portions 630a and 630b. The first penstock portion is coupled to the upper reservoir port and a first cavity tank port located at a bottom of the cavity tank; the second penstock portion is coupled to the lower reservoir port and a second cavity tank port located at a top of the cavity tank. A high-density fluid 651 is contained in the upper reservoir. A lower-density fluid 655 is disposed in the lower reservoir. Typically, the volume of the upper reservoir, lower reservoir and cavity tank may range from about 100,000 to several million cubic meters. The volume, for example, is sufficient to generate the desired output. The output, for example, may be from 10 MW to 1 GW or greater. Other volumes for may also be useful and may depend on, for example, the desired output.

The cavity tank may be located below ground. In one embodiment, a turbine unit 640 is disposed proximate to the lower reservoir. For example, it is disposed between the penstock and the lower reservoir port. The turbine unit may include a turbine and a pump. The turbine, for example, is a Pelton turbine. Other types of turbine units may also be useful. The turbine, for example, can sustain the high pressures of the system.

Providing the high-pressure cavity tank below ground is advantageous as it can utilize the lithostatic pressure, thereby countering the pressure caused by the fluid. This reduces the construction costs of the lower reservoir. In addition, the mountain terrain provides a natural elevation for the upper reservoir. The height at which the upper reservoir is elevated can be configured based on output requirements. For example, lower elevations may be useful to reduce costs associated with building the upper reservoir and penstock if output requirements are met.

In one embodiment, the system is configured with a fire extinguisher sub-system. For example, the system is configured with storage and fire extinguisher sub-systems. In one embodiment, the fire extinguisher sub-system includes an extinguisher conduit 660. The extinguisher conduit, in one embodiment, is coupled to the cavity tank. For example, the first end of the extinguisher conduit is coupled to the cavity tank. A second end of the extinguisher unit extends to the surface of the ground, such as the escarpment. Alternatively, the extinguisher conduit may also be coupled to other parts of the system. For example, the extinguisher conduit may be coupled to the second penfold section or anywhere before the turbine.

In one embodiment, the extinguisher conduit is built by raise boring technique. Other techniques for providing the extinguisher conduit may also be useful. The extinguisher conduit includes a first end which extends from the surface of the ground or escarpment to the cavity tank. For example, a second end of the extinguisher conduits in communication with the cavity tank. In one embodiment, the cavity tank may include an extinguisher opening which includes an extinguisher opening extension protruding from the cavity tank. The second end of the extinguisher conduit is in fluid communication with the extinguisher opening extension. Other types of extinguisher conduits may also be useful. In another embodiment, the extinguisher conduit may be a shaft created by raise boring which is lined with a pipe.

A flow control unit is provided to control the flow of water either to the second reservoir or through the extinguisher conduit. The flow control unit, in one embodiment, includes a valve. The valve, for example, is disposed just before the nozzle. The valve is opened to activate the extinguisher sub-system. For example, a valve controller opens the valve to activate the extinguisher sub-system. The valve is closed in normal operation. Other configurations of a flow control unit may also be useful.

In another embodiment, a flow control unit 666 may include a plurality of valves. In one embodiment, the flow control unit includes a first valve in the second penstock portion and a second valve in the extinguisher conduit. The flow control unit includes a valve controller for controlling the closing and opening of the valves. When one valve is open to allow water to flow through, the other valve is closed to block the flow of water. For example, when the first valve is opened, the second valve is closed. This causes water to flow through the second penstock portion to the second reservoir while the extinguisher conduit is blocked. On the other hand, when the first valve is closed, the second valve is opened. This causes water to flow through the extinguisher conduit while the second penstock portion is blocked.

In one embodiment, a nozzle unit 680 is coupled to the second end of the extinguisher unit. The nozzle unit includes a nozzle. The nozzle may be connected to the second end of the extinguisher conduit. The nozzle is configured to project water from the extinguisher conduit. The nozzle preferably is a shaped non-circular section nozzle to allow the water to glide in the air to achieve maximum distance.

In one embodiment, the nozzle unit includes hydraulic actuators and an actuator controller. The actuator controller controls the actuators to control the direction of the nozzle. In some embodiments, the actuator controller controls the actuators to control the flow rate of the water projecting out of the nozzle. In a preferred embodiment, the actuator controller controls the actuators to control the direction and flow rate using a valve.

As the dense fluid is much denser than water, the pressure at the nozzle is several times higher compared to a system with just water. Further, the pressure is generated by gravity. The high pressure is used to project a powerful water jet that can be sustained for a long period of time, such as hours. The duration, of course, depends on the capacity of the reservoirs. The higher the capacity, the longer the duration. Furthermore, the ejection speed of the water from the nozzle is high enough to allow a stable water jet to reach any point in a circle with a radius of several km.

In one embodiment, an additive supply reservoir 676 is provided in fluid communication with the extinguisher conduit. The additives, for example, are configured to turn the water into a gel to improve water jet cohesiveness and aerodynamics so it can glide through the air. The additive supply reservoir includes an additive supply controller to dispense additives in the water as it ejects from the nozzle. As shown, the additive supply reservoir is disposed proximate to the nozzle unit under the surface of the ground. In other embodiments, the additive supply reservoir may be located above the ground and in fluid communication with the extinguisher sub-system just before the nozzle. Other configurations of the additive reservoir may also be useful. The additives are selected to enhance the stability of the water jet. For example, the additives reduce or minimize dissolved gases in the water. Additives, such as finely ground dunite, may be supplied to the water. Other types of additives may also be useful.

The operation of the system 600 is similar to that of system 200 in FIG. 2. For example, lower-density fluid flowing into the lower reservoir causes the turbine to turn in the first direction, generating power. To recharge the system, the pump pumps the lower-density fluid down to the cavity tank in the second direction, causing the high-density fluid to flow back into the upper reservoir.

In the case when the extinguisher sub-system is to be activated, the system is recharged. Once recharged, the flow controller closes the first valve and opens the second valve. As the high-density fluid flows into the cavity, the water is directed towards the nozzle through the extinguisher conduit.

As described, the system serves both as a power generator and a fire extinguisher. Generally, the systems are located at remote areas which are hard to access. The system having a fire extinguisher sub-system provides a water supply to put out fires without endangering any people or requiring aircrafts. For example, fires can be extinguished in inaccessible escarpments under any weather conditions, at any time hour, even at night, at such a low marginal cost that we can contemplate using it preventively, to lower the risk of fire by supplying moisture to a large area when risk is extreme.

After use, the system may be replenished with water. For example, the second reservoir may be replenished with additional water. For example, water may be provided through the extinguisher penstock or through a refilling penstock connected to the second reservoir. In some cases, water may be replenished to extend the capacity of the extinguisher sub-system during operation by replenishing it with water. The water may be brought in by, for example, trucks or by other alternative options.

The inventive concept of the present disclosure may be embodied in other specific forms without departing from the spirit or essential characteristics thereof. The foregoing embodiments, therefore, are to be considered in all respects illustrative rather than limiting the invention described herein. The scope of the invention is thus indicated by the appended claims, rather than by the foregoing description, and all changes that come within the meaning and range of equivalency of the claims are intended to be embraced therein.

The invention claimed is:

1. A pumped hydro storage system comprising:
a first reservoir;
a second reservoir;
a cavity tank, the cavity tank is disposed at a cavity tank elevation which is below a second reservoir elevation of the second reservoir;
a turbine unit, the turbine unit includes a first turbine unit flow port and a second turbine unit flow port;
a penstock which is in fluid communication with the first and the second reservoirs via the turbine unit, wherein the penstock comprises
a first penstock portion in fluid communication with the first reservoir and the cavity tank,
a second penstock portion in fluid communication with the second reservoir and the cavity tank via the turbine unit,
the first turbine flow port is in communication with the first reservoir, and
the second turbine flow port is in communication with the second reservoir;
a slurry circulating through the system, wherein the slurry comprises
a first fluid which is high-density fluid, wherein the high-density fluid has a density greater than water, and
a second fluid which is a low density fluid having a density lower than the first fluid, wherein the first and second fluid forms a binary slurry;
wherein the slurry flows through the turbine unit in a first direction from the first reservoir to the second reservoir to cause the turbine unit to generate energy and the slurry flows through the turbine unit in a second direction from the second reservoir to the first reservoir to recharge the system; and
wherein the high-density fluid increases power output of the system as compared to water.

2. The system of claim 1 wherein the second reservoir comprises a second reservoir elevation, the second reservoir elevation is lower than a first reservoir elevation of the first reservoir.

3. The system of claim 2 wherein the high-density fluid comprises a density which is ≥ about 3 times the density of water.

4. The system of claim 3 wherein the power output of the system is ≥ about 3 times when using the high-density fluid instead of water.

5. The system of claim 1 wherein the high-density fluid comprises a magnetite slurry with magnetite particles.

6. The system of claim 5 wherein:
a volume percent of magnetite particles in the magnetite slurry is about 50%, and
a volume percent of magnetite in the magnetite particles in the magnetite slurry is about 50-85%.

7. The system of claim 5 wherein a particle size of magnetite particles in the magnetite slurry is in a micron regime.

8. The system of claim 1 further comprises a fire extinguisher sub-system, wherein:
the fire extinguisher sub-system comprises:
an extinguisher conduit unit coupled to the cavity tank wherein
the first end of the extinguisher conduit is coupled to the cavity tank, and
the second end of the extinguisher unit extends to the surface of the ground;
a flow control unit configured to control the flow of the water, the flow control unit comprises
a first valve in the second penstock, and
a second valve in the extinguisher conduit, and
a valve controller configured to control closing and opening of the valves;
a nozzle unit coupled to the second end of the extinguisher unit configured to project water.

9. The system of claim 8, wherein:
the extinguisher conduit is built by raise boring method wherein
a first end extends from the surface of the ground to the cavity tank, and
a second end of the raise boring is in communication with the cavity tank, and
the cavity tank includes an extinguisher opening which includes an extinguisher opening protruding from the cavity tank;
the valve controller is configured to only open one valve wherein when one valve is open to allow water to flow through, the other valve is closed to block the flow of water;
the nozzle unit comprises
hydraulic actuators, and
an actuator controller configured to control the direction and flow rate of the water using a valve;
wherein the high-density fluid increases pressure at the nozzle compared to a system with water.

10. The system of claim 8 wherein:
the high density fluid of the binary slurry comprises slurry; and
the low density fluid of the binary slurry comprises water.

11. The system of claim 10 wherein:
the high density fluid is configured to flow from the first reservoir; and
the low density fluid is configured to flow from the second reservoir.

12. The system of claim 11 wherein the high-density fluid comprises a density which is ≥ about 3 times the density of water.

13. The system of claim 11 wherein the high-density fluid comprises a magnetite slurry with magnetite particles.

14. The system of claim 1 wherein, the second reservoir elevation is lower than a first reservoir elevation of the first reservoir.

15. The system of claim 14 wherein:
the first turbine unit flow port is coupled to the second penstock portion; and
the second unit flow port is coupled to a second reservoir flow port of the second reservoir.

16. The system of claim 1 wherein the second reservoir elevation is about equal to a first reservoir elevation of the first reservoir.

17. The system of claim 1 wherein the cavity tank is disposed directly below the second reservoir.

18. The system of claim 17 wherein:
the first reservoir flow port is disposed at about a bottom of the first reservoir;
the second reservoir flow port is disposed at about a bottom of the second reservoir;

the first cavity tank flow port is disposed at about a bottom of the cavity tank;
the second cavity tank flow port is disposed at about a top of the cavity tank; and
the first penstock portion is configured with a lowest first penstock portion disposed below the cavity tank elevation.

19. The system of claim 1 wherein the cavity tank comprises first and second cavity tank flow ports, the first cavity tank flow port is coupled to the first penstock portion and the second cavity tank flow port is coupled to the second penstock portion.

* * * * *